(12) United States Patent
Bodanapu et al.

(10) Patent No.: US 10,354,343 B2
(45) Date of Patent: Jul. 16, 2019

(54) AUTOMATED PROCESS CONTROL HARDWARE ENGINEERING USING SCHEMA-REPRESENTED REQUIREMENTS

(71) Applicant: Invensys Systems, Inc., Foxboro, MA (US)

(72) Inventors: Padmaja Bodanapu, Secunderabad (IN); Dinesh Gondhi, Hyderabad (IN); Mukund Seshadri, Foxboro, MA (US); Sameer Kondejkar, Pune (IN); James Gerard Luth, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 284 days.

(21) Appl. No.: 15/351,014

(22) Filed: Nov. 14, 2016

(65) Prior Publication Data
US 2018/0136637 A1    May 17, 2018

(51) Int. Cl.
*G05B 19/418*    (2006.01)
*G06Q 50/04*    (2012.01)
*G06F 17/50*    (2006.01)

(52) U.S. Cl.
CPC .............. *G06Q 50/04* (2013.01); *G06F 17/50* (2013.01); *Y02P 90/30* (2015.11)

(58) Field of Classification Search
CPC .. G05B 19/4183; G05B 11/01; G05B 19/418; G05B 2219/25294; G05B 15/02; G06F 17/50; G06F 13/4282; G06F 13/36; G06Q 50/04; F16K 31/06; G05D 7/0629
See application file for complete search history.

(56) References Cited

U.S. PATENT DOCUMENTS

| | | | |
|---|---|---|---|
| 8,000,832 B1 | 8/2011 | Schmidtke et al. | |
| 2009/0282067 A1* | 11/2009 | Bendigeri | G05B 19/042 |
| 2010/0050020 A1* | 2/2010 | Weatherhead | G06F 11/3664 714/38.14 |
| 2010/0077111 A1* | 3/2010 | Holmes | H04L 12/40013 710/33 |
| 2011/0288837 A1* | 11/2011 | Blevins | G05B 17/02 703/6 |
| 2013/0077477 A1* | 3/2013 | Daraiseh | H04W 40/22 370/225 |
| 2015/0127876 A1* | 5/2015 | Erni | G05B 19/4185 710/315 |
| 2016/0274978 A1* | 9/2016 | Strohmenger | G05B 13/04 |
| 2017/0178487 A1* | 6/2017 | Gopisetti | G01R 31/021 |

FOREIGN PATENT DOCUMENTS

| | | |
|---|---|---|
| EP | 2871587 A1 | 5/2015 |
| GB | 2446258 A | 8/2008 |

OTHER PUBLICATIONS

Extended European Search Report for 17199903.0, dated Jan. 2, 2018 (10 pages).

* cited by examiner

*Primary Examiner* — Shahed Ahmed
(74) *Attorney, Agent, or Firm* — Stinson LLP

(57) ABSTRACT

Automated hardware device engineering and design by representing hardware engineering requirements via a wiring typical schema. An engineering workbench application executing on a computing device utilizes a wiring typical schema representing generic and project-specific requirements to automate hardware device engineering and design tasks in real time.

19 Claims, 16 Drawing Sheets

AUTOMATED PROCESS CONTROL HARDWARE ENGINEERING USING SCHEMA-REPRESENTED REQUIREMENTS

TECHNICAL FIELD

Aspects of the present disclosure generally relate to the field of engineering and designing networked computerized control and safety systems utilized to monitor, log, and display relevant manufacturing/production events and associated data. More particularly, aspects relate to systems and methods for automating hardware device engineering and design tasks.

BACKGROUND

Industrial control and safety systems include cabinets, such as marshalling cabinets to interface wiring and/or cabling from a field device with input/output (I/O) devices. For each of these I/O signals within a single cabinet there are a wide variety of devices, third-party components, termination assemblies, wires, and cable markers that need to be taken into account during engineering and design of the cabinet. Due to the large number of cabinets within a project (e.g., upwards of 3000 cabinets), there are potentially millions of data records that require many hours of manual data manipulations. Errors in the manual calculations and requirements changes late in the engineering and design process leads to expensive and time-consuming rework and waste. Physical components also require ordering lead time and late completion of design work causes delay in plant commissioning. No solutions currently exist address these challenges.

SUMMARY

Aspects of the disclosure represent all generic and project-specific hardware engineering requirements via a wiring typical schema that enables an engineering workbench application to automate hardware device engineering and design tasks in real time.

In an aspect, an automated hardware engineering system includes a processor and a computer-readable storage medium storing processor-executable instructions. When executed by the processor, the instructions perform an automated hardware engineering process. The instructions receive a wiring index that includes one or more tags. Each tag represents a field device for an industrial process control system. The wiring index also includes values that each defines a signal type for a corresponding tag. In response to receiving the wiring index, the instructions parse the wiring index to identify each tag and its corresponding value defining the signal type. In response to the parsing, the instructions associate a wiring typical with each identified tag. The wiring typical comprises a schema that represents one or more definable property values of the field device represented by the tag. In response to the associating, the instructions populate a cabinet component with hardware device components to satisfy the property values of every tag. The cabinet component represents a cabinet for the industrial process control system and the hardware device components represent a hardware device for installing within the cabinet. In response to the populating, the instructions map connections of wiring components between the hardware device components to satisfy the property values of every tag. The wiring components each represent a wire coupling the hardware devices represented by the hardware device components.

In another aspect, a computer-implemented method includes an engineering workbench application executing on a computing device receiving a wiring index. The wiring index includes tags each representing a field device within an industrial process control system. The wiring index also includes values each defining a signal type for a corresponding one of the tags. In response to the receiving, the executing engineering workbench application parses the wiring index to identify each tag of the wiring index and the corresponding values defining the signal types of the tags. In response to the parsing, the executing engineering workbench application associates a wiring typical with each identified tag. The wiring typical comprises a schema representing definable property values of the field device represented by the tag. In response to the associating, the executing engineering workbench application populates a cabinet component with hardware device components to satisfy the property values of every tag. The cabinet component represents a cabinet within the industrial process control system and the hardware device components represent hardware devices within the cabinet. In response to the populating, the executing engineering workbench application maps connections of wiring components between each hardware device component to satisfy the property values of every tag. The wiring components each represent a wire coupling the hardware devices represented by the hardware device components.

In yet another aspect, a method includes designing an arrangement of hardware devices within a cabinet of an industrial process control system. The arrangement satisfies one or more requirements of the industrial process control system. Connections between the arranged hardware devices are also designed. The connections satisfy the requirements of the industrial process control system. The method includes receiving an edited wiring index comprising one or more tags that represent alterations to the requirements of the industrial process control system. An automated engineering workbench application executing on a computing device modifies at least one of the arrangement of hardware devices and the connections in real time. The application performs the modification by parsing the edited wiring index and associating a generic wiring schema with each tag of the edited wiring index.

Other objects and features will be in part apparent and in part pointed out hereinafter.

BRIEF DESCRIPTION OF THE DRAWINGS

FIGS. 5-16 are exemplary screenshots illustrating exemplary graphical user interfaces of the automated hardware engineering system and process.

DETAILED DESCRIPTION

Figure 1:
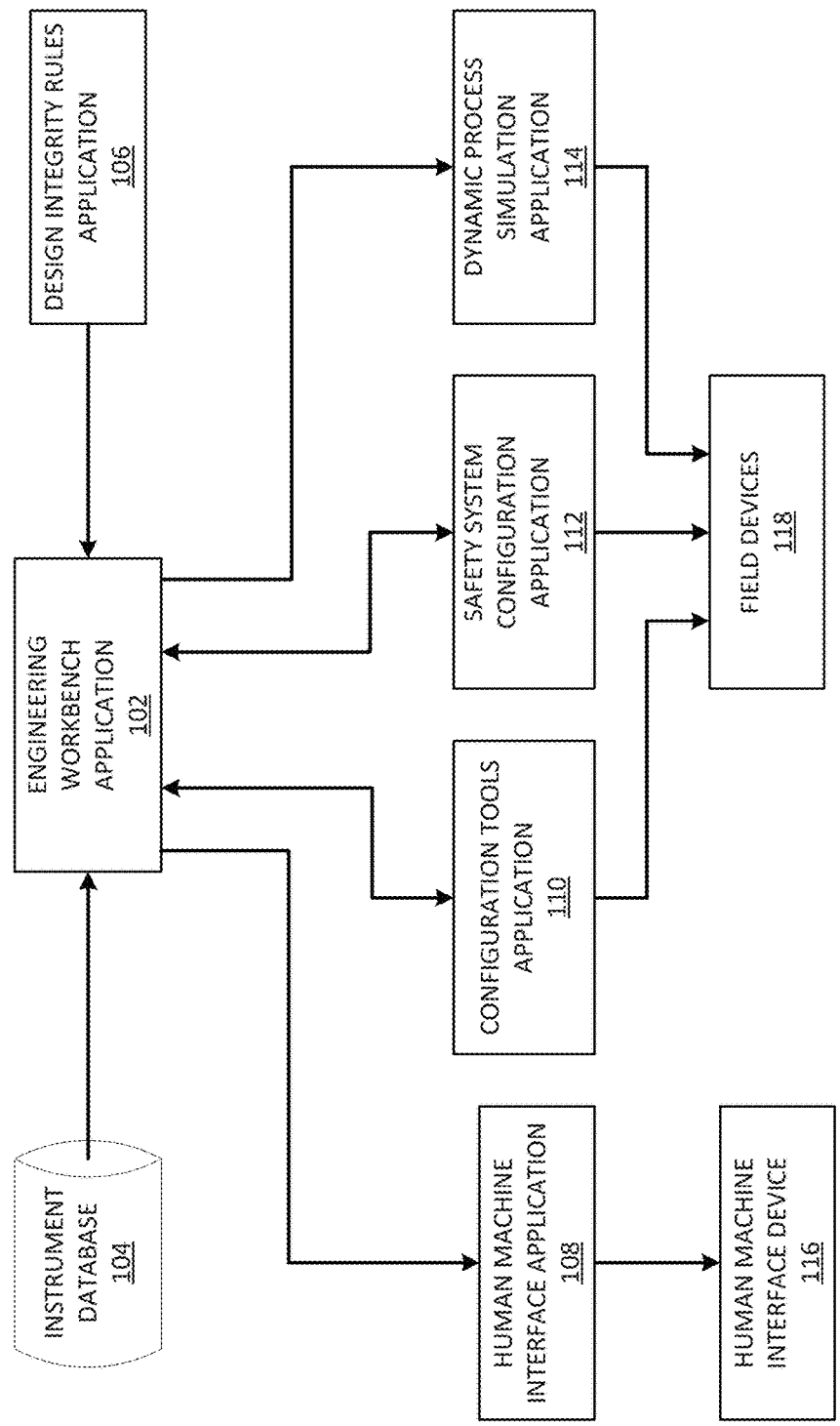
FIG. 1 is a block diagram illustrating an exemplary automated hardware engineering system within which aspects of the disclosure may be incorporated.

FIG. 1 illustrates an exemplary automated hardware engineering system, generally indicated at 100, within which an embodiment of the disclosure may be incorporated. The system includes an engineering workbench application 102, an instrument database 104, a rules application 106, a human-machine interface (HMI) application 108, a configuration tools application 110, a safety system configuration application 112, a dynamic process simulation application 114, an HMI device 116, and field devices 118.

The engineering workbench application 102 is capable of integrating standards (e.g., rules) and processes with data from databases to automate hardware engineering tasks. An exemplary engineering workbench application is Intelligent Engineering Workbench available from Schneider Electric. In an embodiment, engineering workbench application 102 loads controller and I/O module components, which represent corresponding physical hardware devices, in a cabinet component, which represents a corresponding physical marshalling cabinet. In another embodiment, engineering workbench application 102 designs the landing of field cable components on terminal block components in a cabinet component. In this embodiment field cable components represent corresponding physical field cables, terminal block components represent corresponding physical hardware terminals, and the cabinet component represents a corresponding physical cabinet of a process control system. In a further embodiment, engineering workbench application 102 identifies an appropriate wiring typical for each field tag representing a physical hardware device of a process control system.

In another embodiment, engineering workbench application 102 mounts termination assembly components in a cabinet component, where the termination assembly components represent corresponding physical hardware terminals and the cabinet component represents a corresponding physical cabinet of a process control system. In yet another embodiment, engineering workbench application 102 creates a signal cross-wiring component for each loop, where the wiring component represents one or more corresponding physical wires of a process control system. In a further embodiment, engineering workbench application 102 generates manufacturing data (e.g., wiring schedules and drawings) for physical cabinet production using profile templates and generates heat and power data for HVAC and UPS sizing of the physical cabinet.

In one aspect, engineering workbench application 102 is adapted to import field wiring data (e.g., I/O tag list) from instrument database 104. In another aspect, engineering workbench application 102 is adapted to import piping and instrumentation diagrams (P&IDs) and/or design rules from rules application 106 (e.g., SmartPlant P&ID). The engineering workbench application 102 is also adapted to display component representations and/or generated reports on HMI device 116 via HMI application 108 (e.g., Foxboro InTouch). The HMI device 116 may be a workstation computing device, a tablet computing device, a smartphone, and the like. The engineering workbench application 102 is further adapted to interact with configuration tools application 110 (e.g., Foxboro Configuration Tools), safety system configuration application 112 (e.g., TriStation), and/or dynamic process simulation application 114 (e.g., DYNSIM) during testing checks of field devices 118 of a process control system.

Figure 2:
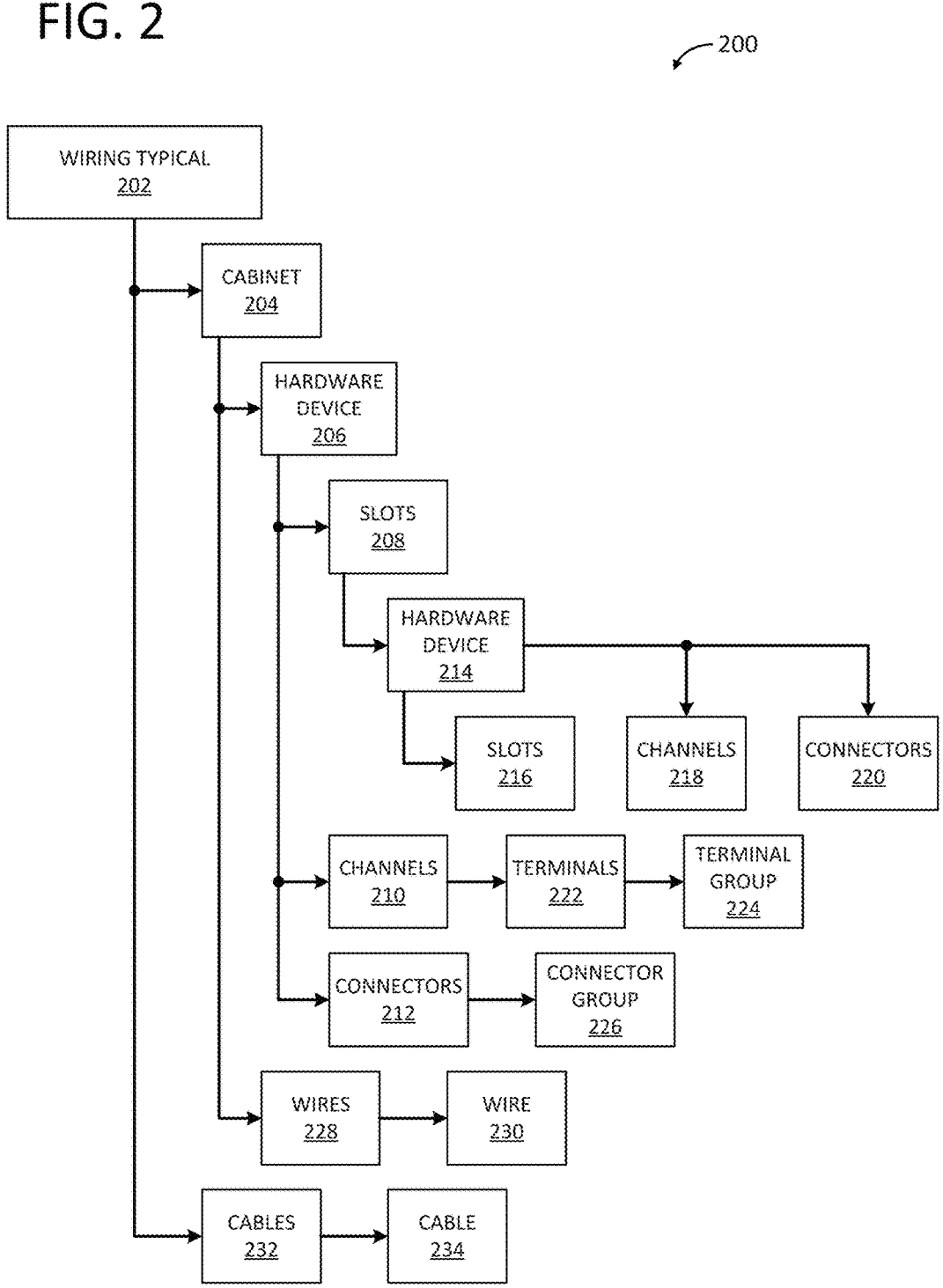
FIG. 2 is a block diagram illustrating an exemplary schema according to an embodiment.

FIG. 2 illustrates an exemplary schema, generally indicated at 200, for representing requirements for hardware engineering of process control devices. The schema 200 represents all generic and project-specific engineering requirements, which enables engineering workbench application 102 to automate hardware device engineering and design tasks in real time. In one form, schema 200 is a generic wiring typical schema that can model hardware devices in a multiple nested level configuration so that any future hardware devices manufactured by any vendor can be engineered in the automated workflow by engineering workbench application 102 without requiring any custom (e.g., manual) development. Advantageously, engineering workbench application 102 utilizing schema 200 reduces the amount of engineering hours for a design project by about 10-14%.

The schema 200 enables automated modeling and engineering of any hardware device. In an embodiment, schema 200 includes a wiring typical component 202, a cabinet component 204, a first hardware device component 206, a first slots component 208, a first channels component 210, a first connectors component 212, a second hardware device component 214, a second slots component 216, a second channels component 218, a second connectors component 220, a terminals component 222, a terminal group component 224, a connector group component 226, a wires component 228, a wire component 230, a cables component 232, and a cable component 234. The components of schema 200 are representations of corresponding aspects of hardware components and may each include one or more definable property values. In an embodiment, schema 200 enables unique representation of devices and/or components and wiring and/or cabling connections between a field junction box and a control processor for each type of signal in an industrial process control system. In another embodiment, schema 200 enables engineering workbench application 102 to automate hardware engineering design processes in accordance with project-specific input/output (I/O) allocation rules. In yet another embodiment, schema 200 enables engineering workbench application 102 to support nested level hardware device configurations through wiring typicals.

Referring further to FIG. 2, the wiring typical component 202 represents a generic wiring typical for an industrial process control system. In an embodiment, wiring typical component 202 is a template, comprised of components within engineering workbench application 102, which defines a tag wiring connection from a physical marshalling cabinet to a physical system cabinet across physical hardware devices that are associated with the tag (see FIGS. 5 and 7-10). The wiring typical component 202 defines the connections between the physical hardware devices by representing them as components within engineering workbench application 102 and using wiring components and cable components, as further described herein. In an embodiment, wiring typical component 202 supports a multi-channel barrier.

The cabinet component 204 represents a cabinet of an industrial process control system. In an embodiment, cabinet component 204 includes a unique name for the cabinet within the industrial process and a definable property value for a cabinet category (e.g., marshalling cabinet, system cabinet, marshalling-system cabinet, etc.).

The first hardware device component 206 and second hardware device component 208 each represent a hardware device of an industrial process control system. In an embodiment, first hardware device component 206 and second hardware device component 208 each include definable property values, including: a device category (e.g., motherboard, daughterboard, etc.), a device number, a hardware type, an identification of applicable slots (e.g., first slot component 208, second slot component 216, etc.), and an identification of channels (e.g., first channels component 210, second channels component 218, etc.) for connected slots.

The first slots component 208 and second slots component 216 each represents a slot (e.g., input/output slot, barrier slot, etc.) of their respective hardware device components (e.g., first hardware device component 206 and second hardware device component 214). In an embodiment, first slots component 208 and second slots component 216 each include two definable property values: a name for the slot and a category for the slot.

The first channels component 210 and second channels component 218 each represent one or more channels associated with their respective hardware device components (e.g., first hardware device component 206 and second hardware device component 214). In an embodiment, first channels component 210 and second channels component 218 each include definable property values, including: a name (e.g., A, B, 1, 2, 3, etc.), an identification of applicable channels (e.g., A, B, C, etc.) that indicates the signal type of each channel of the hardware device, a category for the channel, and a terminal group mapping value that indicates whether the channel versus the terminal mapping is needed.

The first connectors component 212 and second connectors component 220 each represents one or more physical connectors associated with their respective hardware device components (e.g., first hardware device component 206 and second hardware device component 214). In an embodiment, first connectors component 212 and second connectors component 220 each include definable property values, including: a category for the connector and a name for the connector (e.g., J1, J2, P1, etc.).

The terminals component 222 represents one or more terminals associated with a respective channels component (e.g., first channels component 210). In an embodiment, terminals component 222 includes definable property values, including a value for terminal points (e.g., 1, 2, 3, 4, 5, 6, 7, 8, etc.) and a category for the terminal.

The terminal group component 224 represents one or more terminal points with the same polarity across channels (e.g., IN+, IN−, A, B, C, etc.). In an embodiment, terminal group component 224 includes definable property values, including a category for the terminal group and a channel identifier identifying terminal points to which the terminal group is mapped (e.g., IN+ can identify that channel A is mapped with terminal point 2, etc.).

The connector group component 226 represents one or more connectors (e.g., connectors component 212) comprising a group (e.g., J1/J2 Group, etc.). In an embodiment, connector group component 226 includes definable property values, including a connector value (e.g., J1, J2, etc.), a connected slots value (e.g., J1_ConnectedSlots: P1, P2, . . . , P8), and a connected channels value (e.g., 1, 2, . . . , 8).

The wires component 228 represents one or more wires of an industrial process control system. In an embodiment, wires component 228 includes definable property values, including a category for the wires. The wire component 230 represents one or more wires of the industrial process control system that belong to wires component 228. In an embodiment, the wire component 230 includes definable property values, including a category for the wire, a component reference to the source component terminal (e.g., terminals component 222), a component reference to the destination component terminal (e.g., terminals component 222), a color of the wire, a core size of the wire, a wire type of the wire, and a ferrule name.

The cables component 232 represents one or more cables of an industrial process control system. In an embodiment, cables component 232 includes definable property values, including a category for the cables. The cable component 234 represents one or more cables of the industrial process control system that belong to cables component 232. In an embodiment, the cable component 234 includes definable property values, including a category for the cable, a part number of the cable, a type of the cable (e.g., TACable), a component reference to the source component connector group (e.g., connector group 226), and a component reference to the destination component terminal (e.g., connector group 226).

Figure 3:
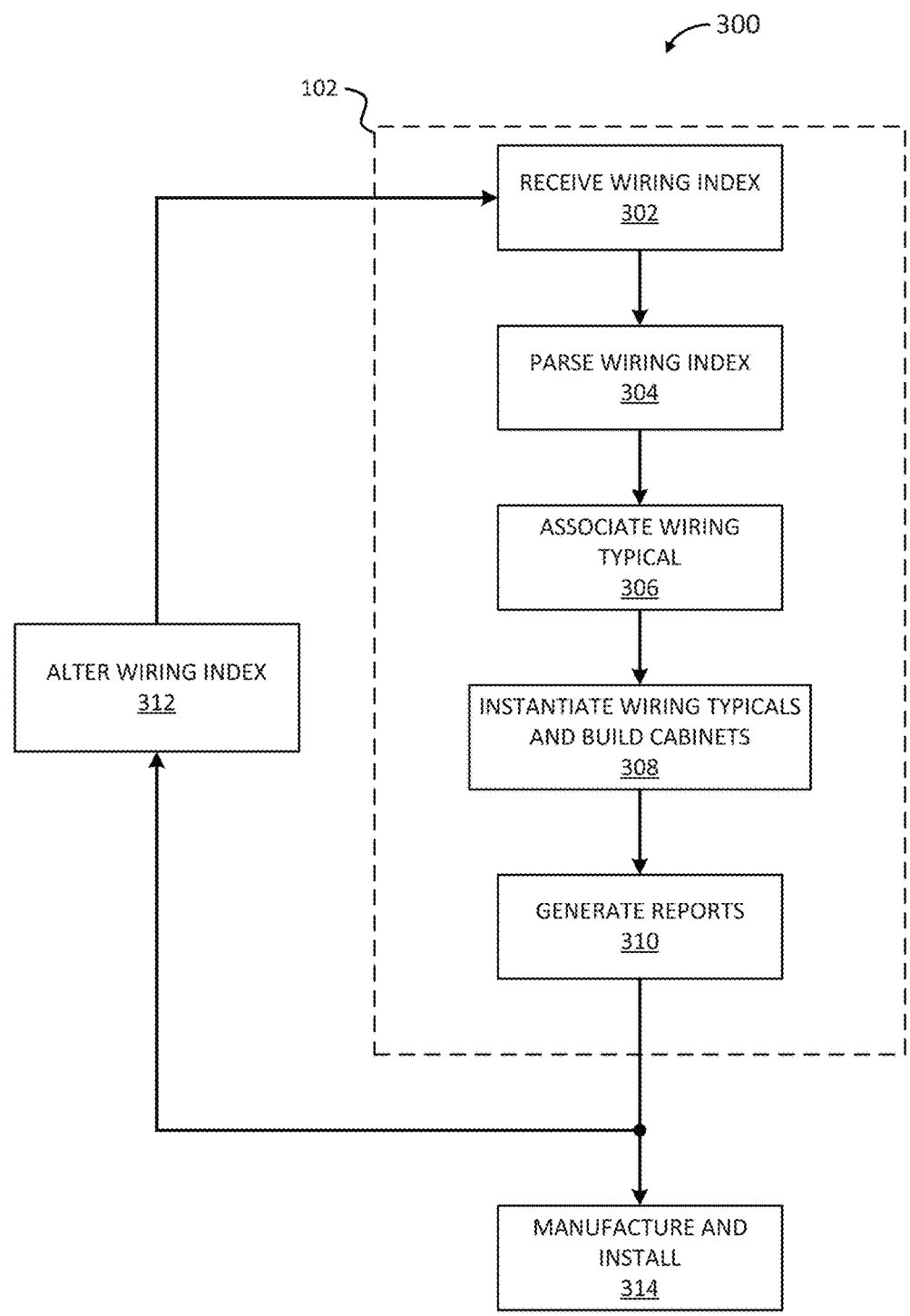
FIG. 3 illustrates an exemplary automated hardware engineering process according to an embodiment.

FIG. 3 illustrates an exemplary automated hardware engineering process, generally indicated at 300, in accordance with an aspect of the disclosure. In an embodiment, engineering workbench application 102 utilizes schema 200 to perform process 300. At step 302, engineering workbench application 102 receives a wiring index that contains a list of all tags and their corresponding signal types. In an embodiment, the wiring index is received from an engineering and procurement contractor (EPC). For example, engineering workbench application 102 may receive the wiring index from a computing device of the EPC via a telecommunications network. In accordance with an embodiment, engineering workbench application 102 performs steps of process 300 in real time.

Engineering workbench application 102 parses the wiring index at step 304 and automatically associates, at step 306, wiring typical component 202 with the tags in the wiring index. In an embodiment, engineering workbench application 102 maps wiring typicals to tags using a worklet (e.g., "assign wiring typical worklet"). In an embodiment, engineering workbench application 102 parses the wiring index at step 304 in response to receiving the wiring index at step 302 and performs the wiring typical association at step 306 in response to parsing the wiring index at step 304.

At step 308, engineering workbench application 102 instantiates wiring typical components 202 and builds cabinet component 204. In accordance with an aspect of the disclosure "building" a cabinet as used herein refers to quantifying hardware device components of the cabinet and determining the optimal wiring and cabling between the relevant hardware device components, thereby automatically accomplishing cross-wiring and I/O point assignment.

Figure 6:
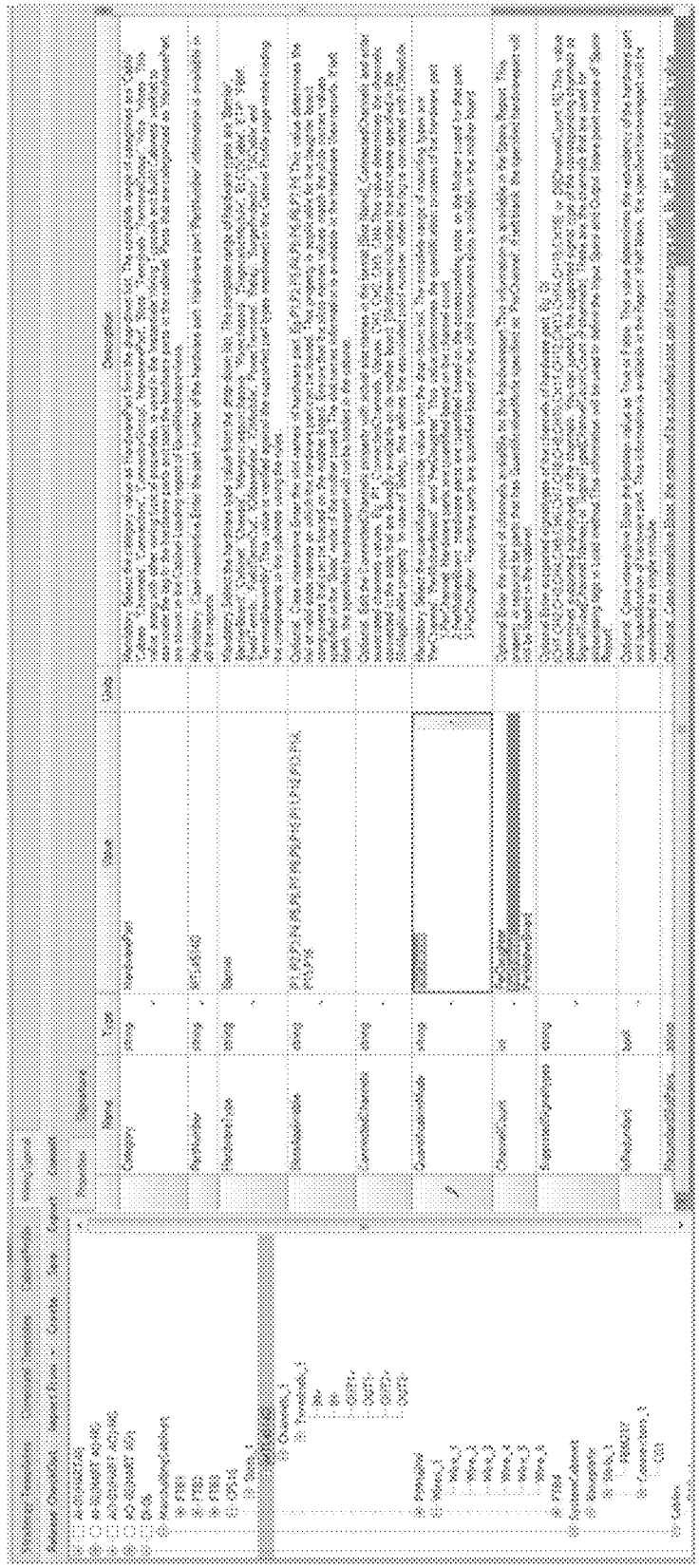
Figure 7:
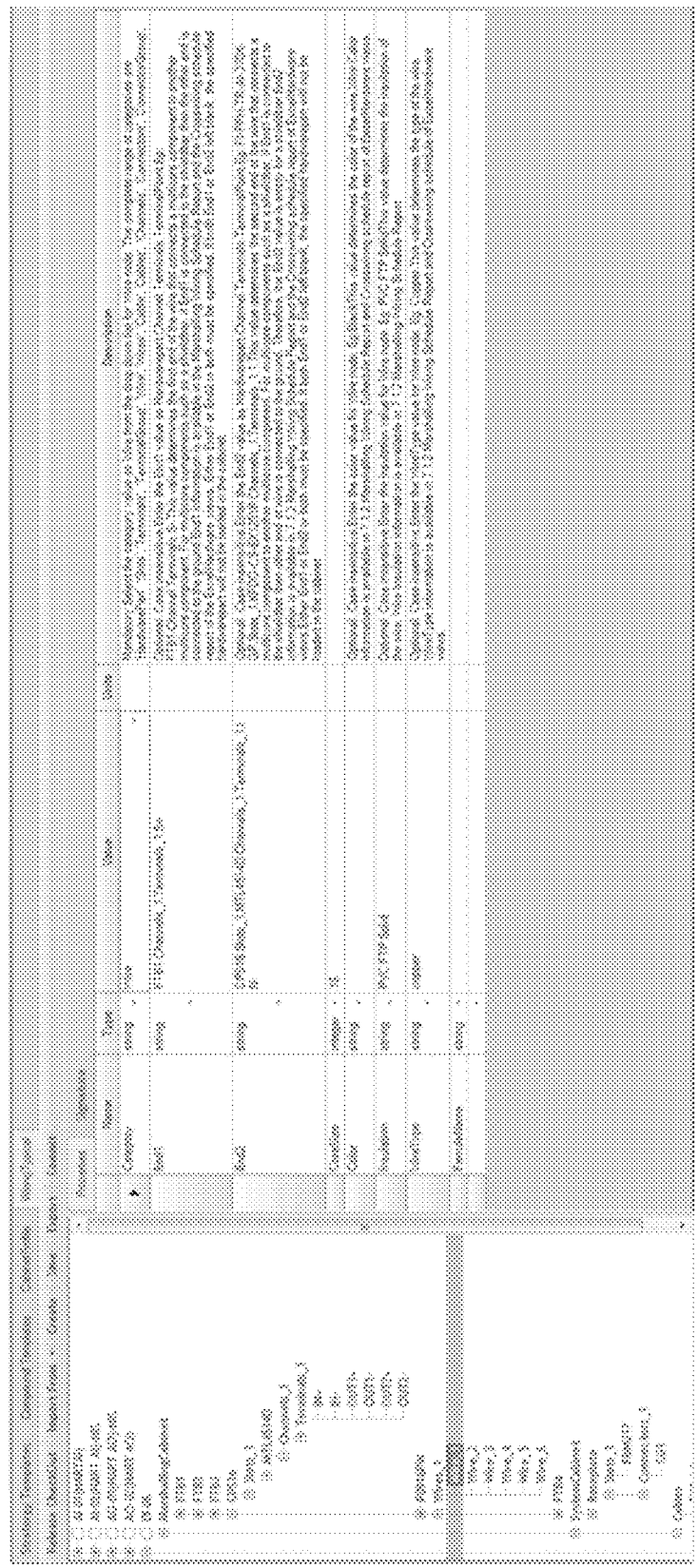
Figure 8:
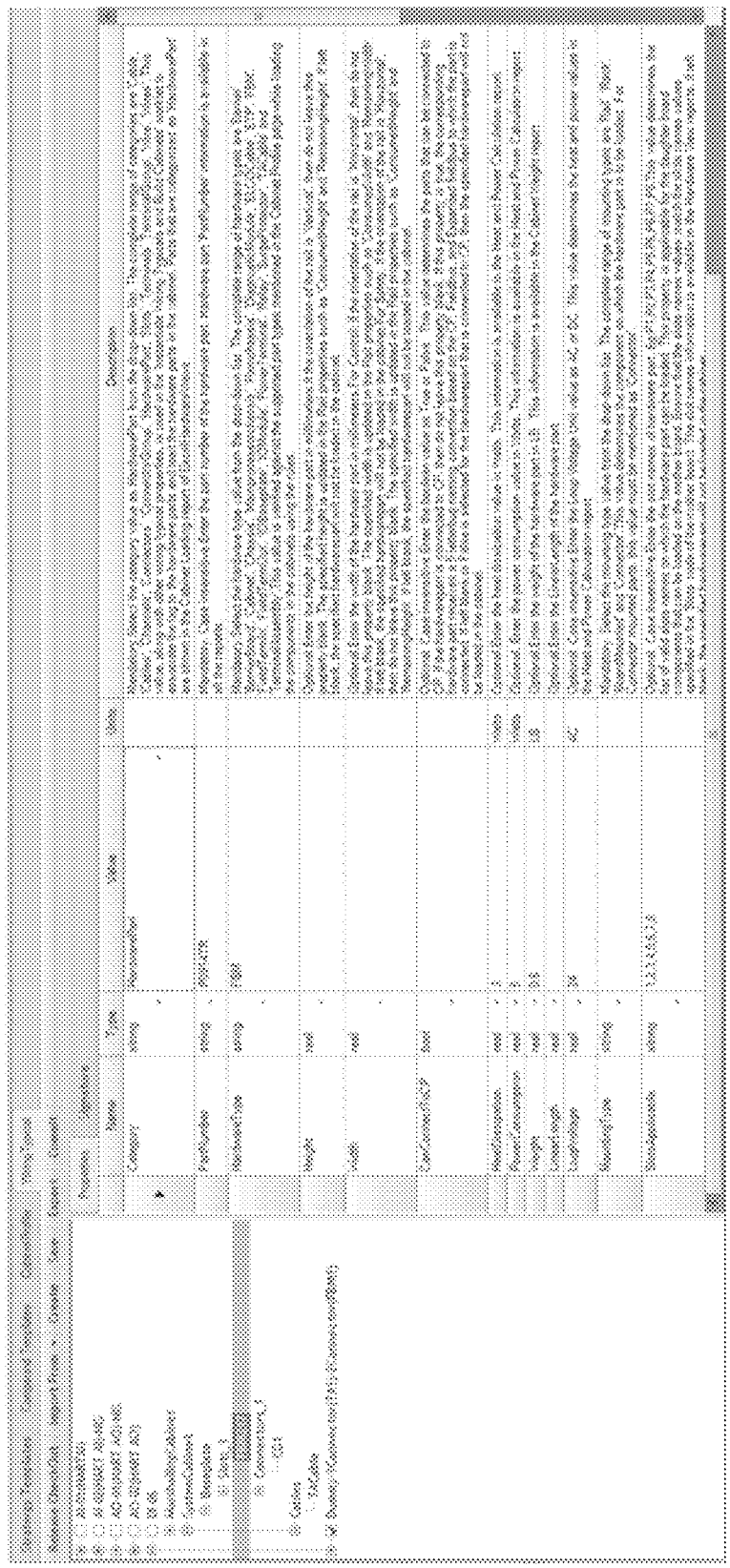
Figure 14:
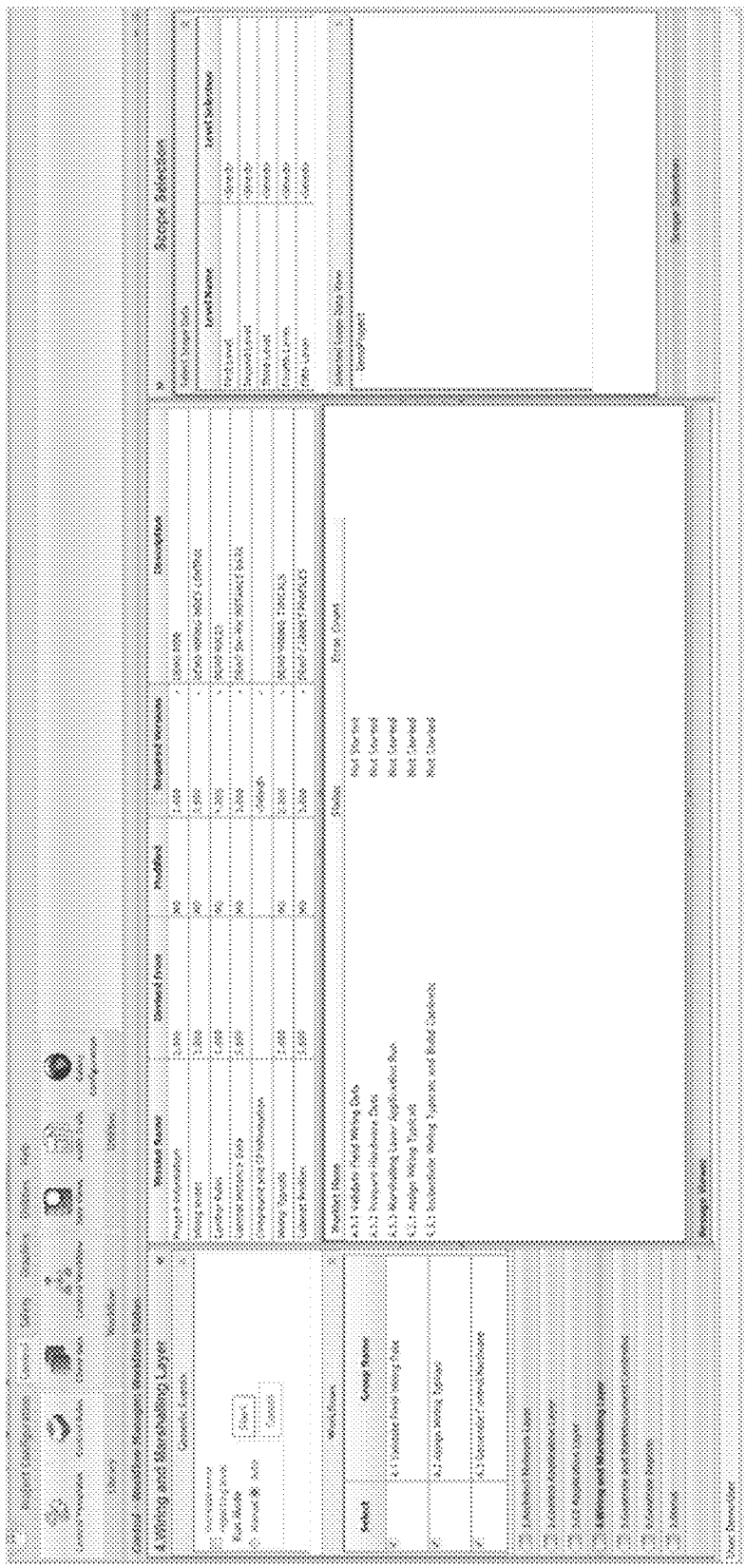

In an aspect, engineering workbench application 102 quantifies hardware device components during step 308. For example, a worklet executed by engineering workbench application 102 in both a control workflow and a safety workflow quantifies system and marshalling device components based on wiring typical component 202 assigned to tags (see FIG. 14). In an embodiment, engineering workbench application 102 quantifies hardware device components based on the value of a "QuantificationMode" property when specified in the wiring typical 202 for hardware device 206 (see FIG. 6). In an embodiment, there is more than one value for the "QuantificationMode" property, such as "PerChannel", "PerMotherboard", and/or "PerDaughter" based on which quantification of hardware devices will be accomplished. Selection of the "PerChannel" value results in hardware parts quantified based on the channel count of the hardware part. For example, when "PerChannel" is selected as the quantification mode for an 8-channel terminal assembly, engineering workbench application 102 quantifies one terminal assembly for every eight tags. Selection of the "PerMotherboard" value results in hardware parts quantified based on the corresponding slots on the motherboard for that hardware part. For example, when "PerMotherboard" is selected for a power conditioner module that needs to be mounted on a slot of a baseplate, engineering workbench application 102 quantifies one power conditioner module for every quantified baseplate. Selection of the "PerDaughter" value results in hardware parts quantified based on the child component slots available on the motherboard. For example, when "PerDaughter" is selected for a baseplate including eight slots to accommodate eight Fieldbus modules (FBM), engineering workbench application 102 quantifies one baseplate for every eight FBM modules.

As an exemplary and non-limiting example, assume a motherboard (e.g., MTLF810A) is specified in two wiring typicals (WT1, WT2), the first wiring typical is assigned to a first tag (Tag1-WT1), and the second wiring typical is assigned to a second tag (Tag2-WT2). The engineering workbench application 102 will quantify one MTLF810A motherboard because it has eight channels, which can support connections to the two tags. Moreover, engineering workbench application 102 will quantify two redundant fieldbus modules because each fieldbus module supports up to four tags and is redundant. In an embodiment, engineering workbench application 102 performs the quantification at step 308 in response to the wiring typical association at step 306.

Further referring to step 308 of FIG. 3, engineering workbench application 102 populates (e.g., loads) cabinet component 204 with hardware device components (e.g., first hardware device component 206, second hardware device component 214, etc.) corresponding to the wiring typical. In an exemplary embodiment, the associated wiring typical requires a motherboard, which causes engineering workbench application 102 to populate cabinet component 204 with a hardware device component having a value of "motherboard" for the hardware type definable property value. In one form, engineering workbench application 102 performs the population at step 308 in response to the wiring typical association at step 306.

Figure 11:
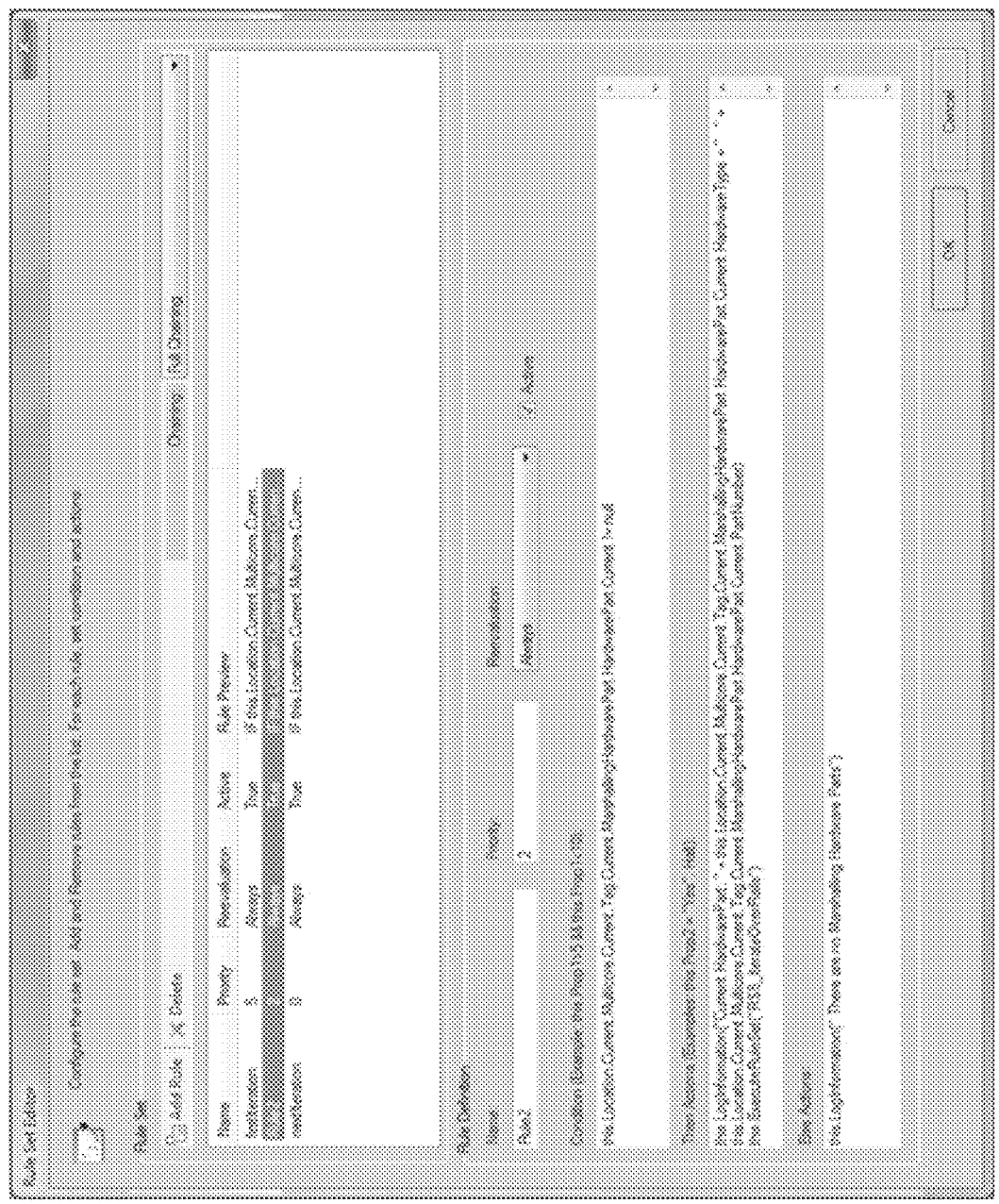
Figure 12:
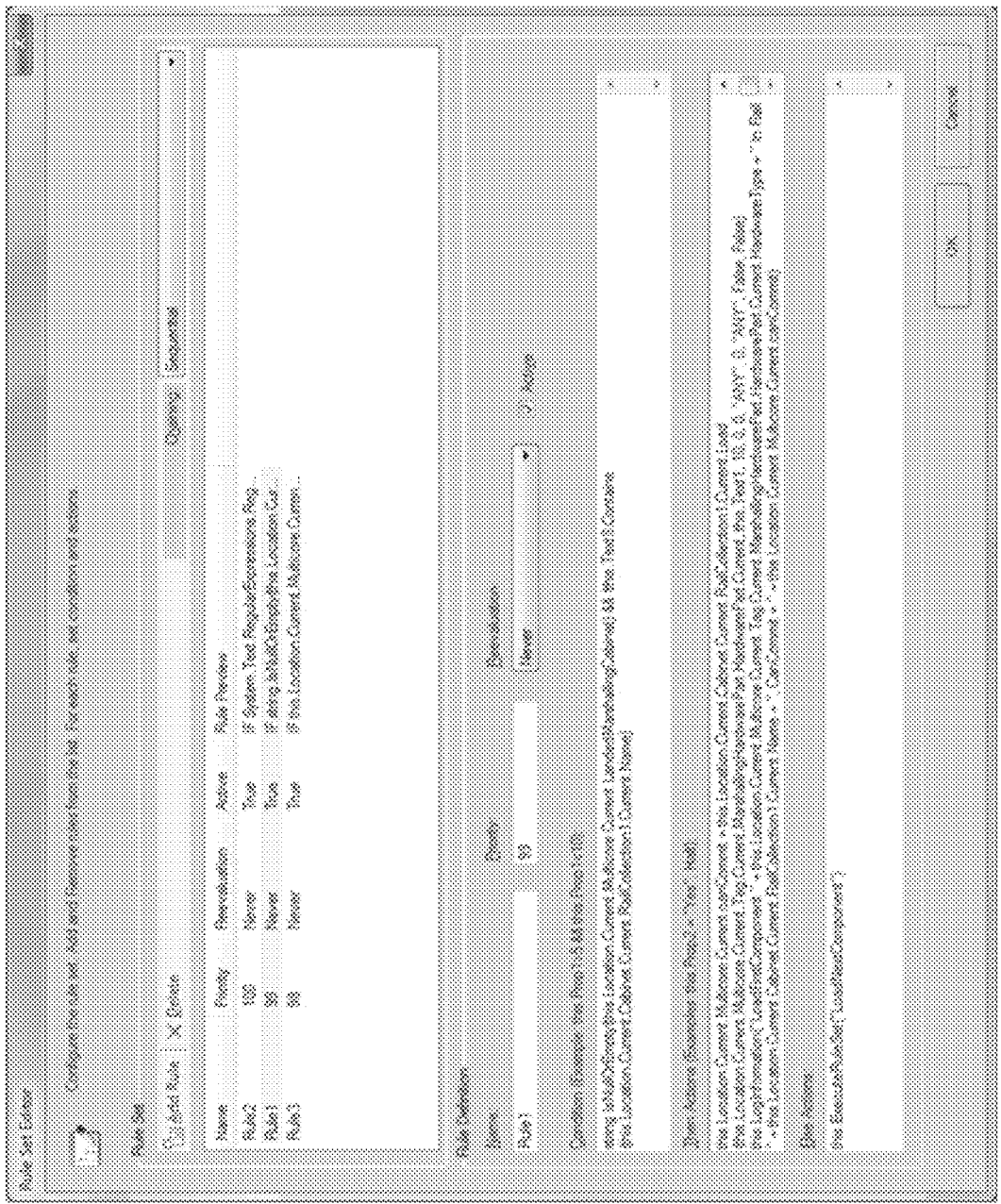
Figure 13:
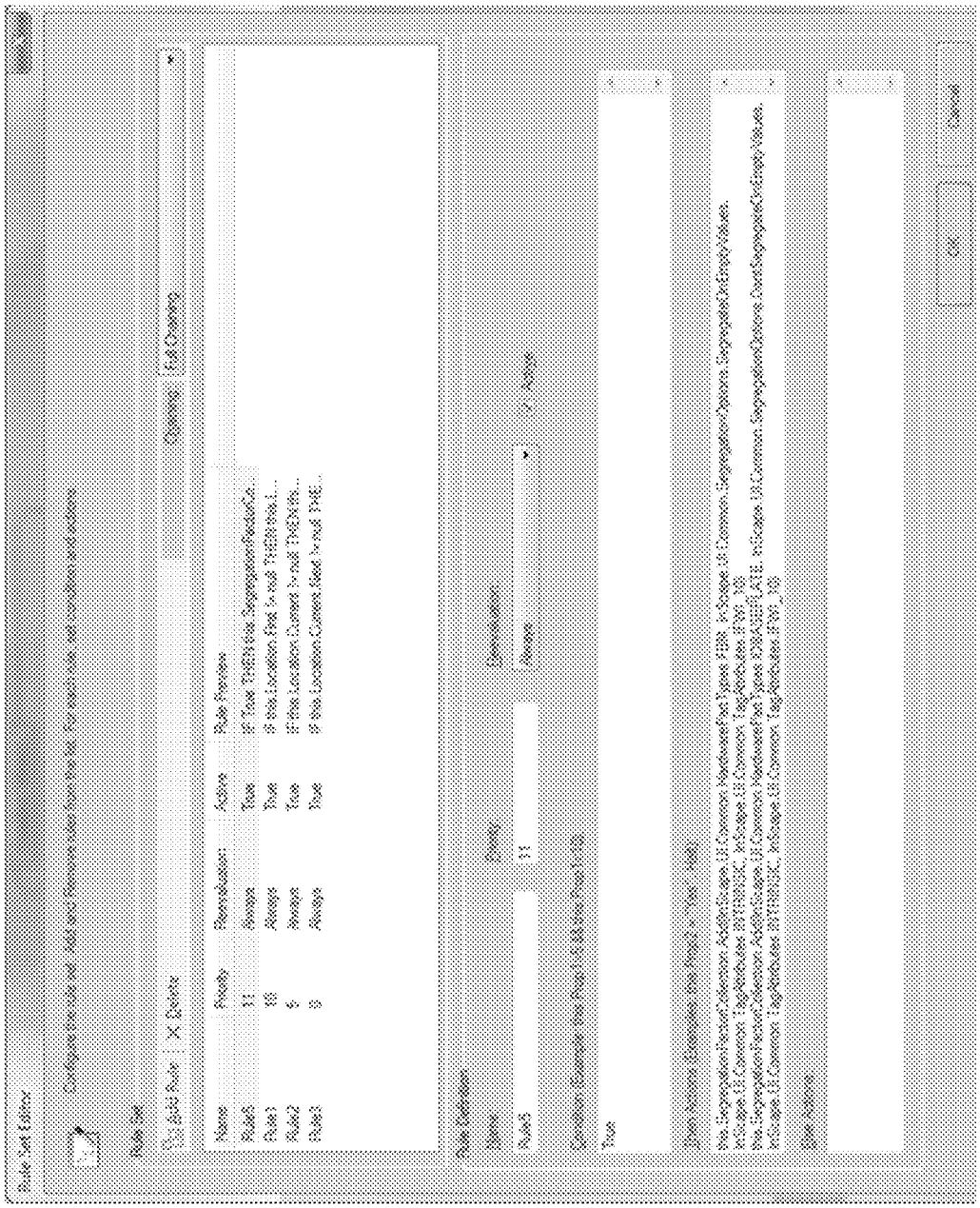

In an aspect, engineering workbench application 102 defines at least one worklet for loading system device components and marshalling device components in safety and control workflows. For example, engineering workbench application 102 may load motherboard components, daughterboard components, rail-based components, and the like. In a further aspect, engineering workbench application 102 uses a rules-based approach to populate cabinet component 204 with hardware device components. In an embodiment, engineering workbench application 102 exposes a set of objects and methods in rules to load components of schema 200 in cabinet component 204 (see FIGS. 11-13). In another embodiment, engineering workbench application 102 permits loading quantified device components using objects and/or methods in user-defined rules. In a further embodiment, engineering workbench application 102 permits loading device components from a project information database, even when the components from the project information database are insufficient and require additional device components based on the tags in the wiring index and part numbers defined in wiring typical 202. In yet another embodiment, engineering workbench application 102 permits loading hardware device components (e.g., motherboards, daughterboards, etc.) onto other motherboard hardware device components in cabinet component 204. In a further embodiment, after hardware device components are loaded, engineering workbench application 102 connects the tags to a terminal assembly/external termination panel using rules and cable configurations defined in wiring typical 202.

With continued reference to step 308 of FIG. 3, engineering workbench application 102 populates cabinet component 204 with wiring (e.g., wires component 228, wire component 230, etc.) and/or cabling (e.g., cables component 232, cable component 234, etc.) between hardware device components (e.g., first hardware device component 206, second hardware device component 208, etc.). In this manner, engineering workbench application 102 automatically accomplishes cross-wiring and I/O point assignment across aspects (e.g., units) of an industrial process plant. The populated wiring and/or cabling represents connections between two or more points (e.g., hardware device components). In one aspect, a wiring component refers to wire between hardware device components. In another aspect, a wiring component refers to a set of wires together in a cable. In an embodiment, engineering workbench application 102 performs the population at step 308 in response to the wiring typical association at step 306.

Figure 15:
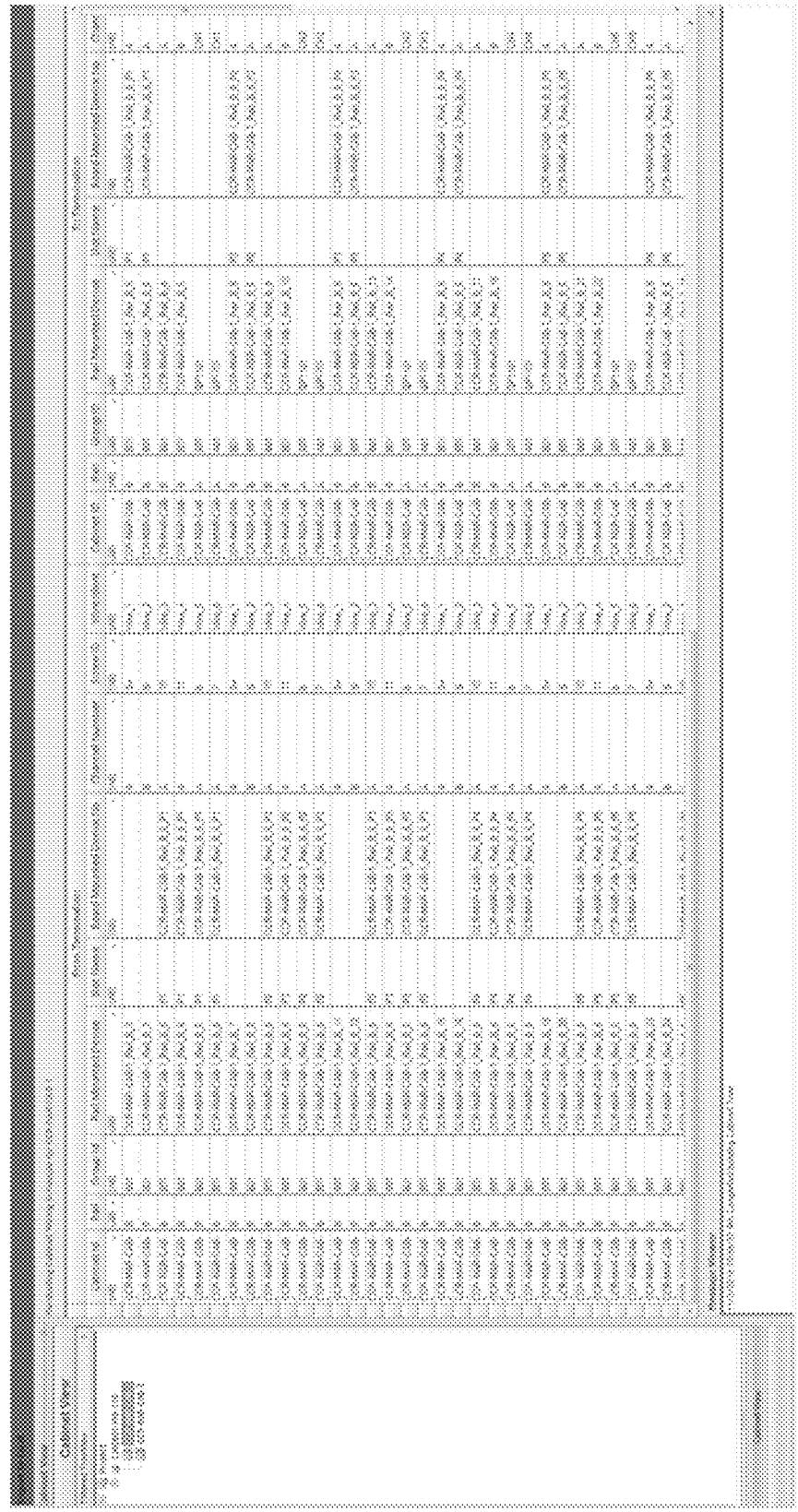
Figure 16:
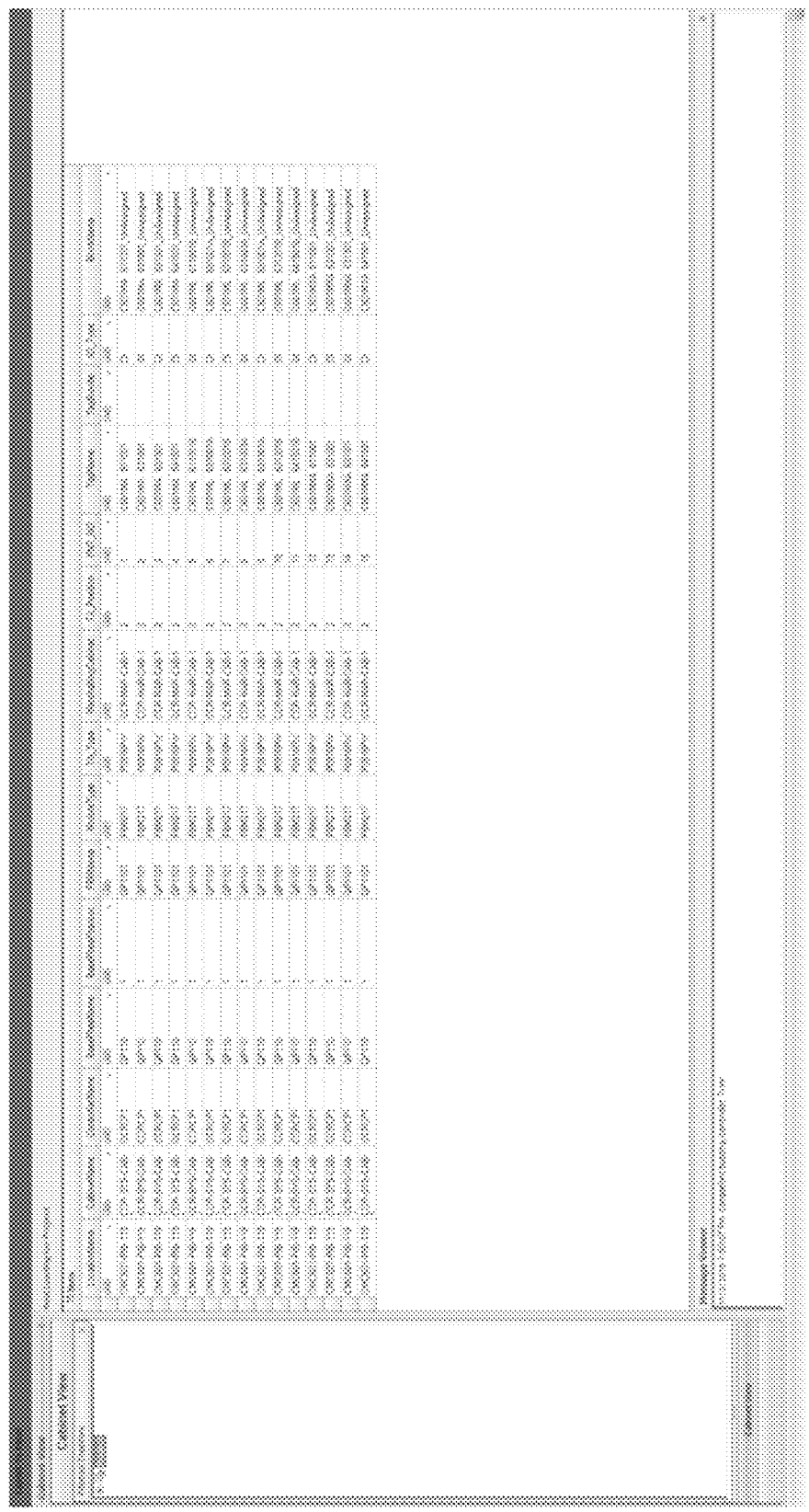

At step 310, engineering workbench application 102 generates one or more reports required for hardware engineering, such as a bill of materials, heat and power calculations, cross-wiring, I/O assignments, cabinet loading reports, and the like (see FIGS. 15 and 16). In an embodiment, generated reports are displayed on HMI device 116 via HMI application 108. In accordance with another embodiment of the disclosure, engineering workbench application 102 generates reports at step 310 in response to the population at step 308 and/or in response to the wiring typical association at step 306.

In an embodiment, the wiring index may change as illustrated at step 312. Exemplary and non-limiting situations that may require a change to the wiring index include: unavailability of a hardware device (e.g., vendor discontinues manufacturing the device or changes the device as part of a product upgrade), a newly available device with better characteristics than an originally-planned device, introduction of a customized device specific to a project, changes requested by a customer, and the like. In response to altering the wiring index at step 312 to reflect requirement changes, the wiring index is transmitted (e.g., transmitted via a telecommunications network, input via an I/O component) to engineering workbench application 102, which performs automated hardware engineering process 300 in real time.

In another embodiment, a safety and control system designed by engineering workbench application 102 is manufactured (314) in accordance with the reports generated at step 310 and installed (314) in an industrial control plant.

Figure 4:
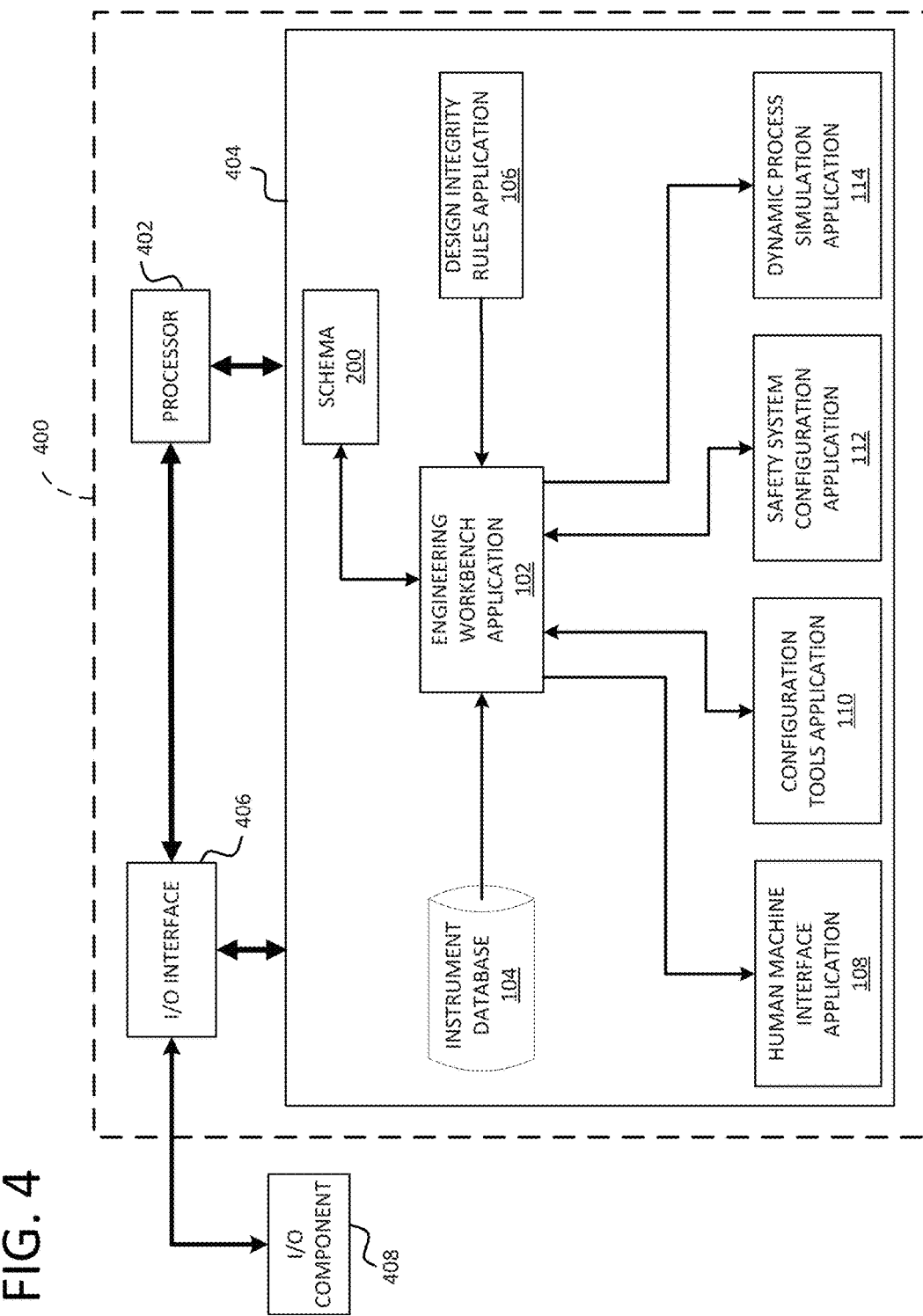
FIG. 4 illustrates an exemplary architecture of a computing device programmed to provide aspects of the automated hardware engineering system and process.
Figure 5:
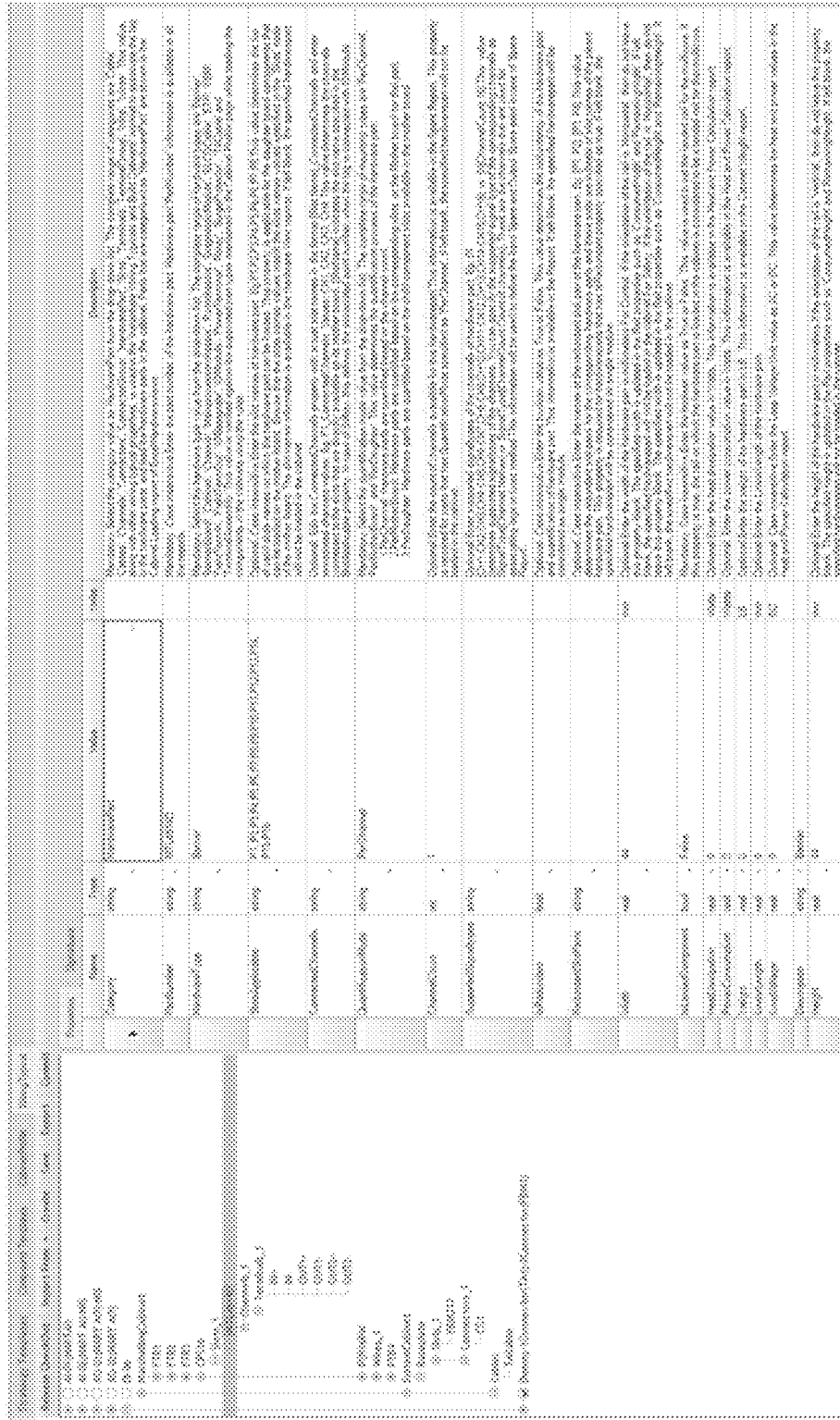

FIG. 4 illustrates an exemplary architecture of a computing device 400 programmed to provide aspects of the automated hardware engineering system and process via a software environment. In this embodiment, computing device 400 includes a processor 402, a memory 404, and an input/output (I/O) interface 406 that interfaces with an I/O component 408. The memory 404 includes engineering workbench application 102, instrument database 104, rules application 106, HMI application 108, configuration tools application 110, safety system configuration application 112, and dynamic process simulation application 114 each embodied in processor-executable instructions for executing by processor 402. In this manner, computing device 400 comprises a special-purpose computing device for automated hardware engineering in real time.

The processor 402, memory 404, and I/O interface 406 are communicatively connected and/or electrically connected to each other. The I/O interface 406 is communicatively and/or electrically connected to the I/O component 408. The processor 402 is adapted to execute processor-executable instructions stored in the memory 404 for implementing the automated hardware engineering system and process in real time. The I/O interface 406 of FIG. 4 provides a physical data connection between computing device 400 and I/O component 408. In an embodiment, I/O interface 406 is a network interface card (NIC) or modem and I/O component 408 is a telecommunications network.

In addition to the embodiment described above with respect to FIG. 4, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An automated hardware engineering system comprising:
    at least one processor; and
    one or more processor-executable instructions stored on at least one computer-readable storage medium of the automated hardware engineering system, said processor-executable instructions including instructions that, when executed by the at least one processor:
    receive a wiring index, the wiring index including one or more tags each representing a field device for an industrial process control system, and the wiring index further including one or more values each defining a signal type for a corresponding one of the tags;
    parse, in response to said receiving, the wiring index to identify each tag of the wiring index and the corresponding value defining the signal type thereof;
    associate, in response to said parsing, a wiring typical with each identified tag, wherein the wiring typical comprises a schema representing one or more definable property values of the field device represented by the tag;
    populate, in response to said associating, a cabinet component stored on the at least one computer-readable storage medium with one or more hardware device components to satisfy the property values of every tag, wherein the cabinet component represents a cabinet for the industrial process control system, and wherein the hardware device components each represent a hardware device for installation within the cabinet; and
    map, in response to said populating, connections of one or more wiring components between each hardware device component to satisfy the property values of every tag, wherein the wiring components each represent a wire coupling the hardware devices represented by the hardware device components.

2. The automated hardware engineering system of claim 1, further comprising processor-executable instructions stored on the at least one computer-readable storage medium that, when executed by the at least one processor:
    receive an edited wiring index including one or more alterations to the tags thereof; and
    update a design of the industrial process control system in real time in response to receiving the edited wiring index by performing said parsing, said associating, said populating, said determining, and said generating on the edited wiring index.

3. The automated hardware engineering system of claim 1, wherein the schema represents nested level hardware device connections.

4. The automated hardware engineering system of claim 1, wherein the field devices each comprise a junction box, and wherein the hardware devices each comprise a control processor.

5. The automated hardware engineering system of claim 1, wherein the one or more definable property values each comprise a project-specific input/output allocation rule.

6. The automated hardware engineering system of claim 1, wherein the processor-executable instructions further include instructions that, when executed by the at least one processor, generate, in response to said mapping, one or more engineering reports based on the cabinet component, the hardware device components, and the wiring components.

7. The automated hardware engineering system of claim 6, wherein the generated engineering reports enable installation of the cabinet, the hardware devices, and the wires in the industrial process control system.

8. The automated hardware engineering system of claim 7, wherein the generated engineering reports comprise at least one of: a bill of materials, heat and power calculations, a cross-wiring diagram, an input/output pin assignment, and a cabinet loading report.

9. A computer-implemented method comprising:
receiving, by an engineering workbench application executing on a computing device, a wiring index, wherein the wiring index includes one or more tags each representing a field device within an industrial process control system, and wherein the wiring index further includes one or more values each defining a signal type for a corresponding one of the tags;
parsing, by the engineering workbench application executing on the computing device in response to said receiving, the wiring index to identify each tag of the wiring index and the corresponding value defining the signal type thereof;
associating, by the engineering workbench application executing on the computing device in response to said parsing, a wiring typical with each identified tag, wherein the wiring typical comprises a schema representing one or more definable property values of the field device represented by the tag;
populating, by the engineering workbench application executing on the computing device in response to said associating, a cabinet component with one or more hardware device components to satisfy the property values of every tag, wherein the cabinet component represents a cabinet within the industrial process control system, and wherein the hardware device components each represent a hardware device within the cabinet; and
mapping, by the engineering workbench application executing on the computing device in response to said populating, connections of one or more wiring components between each hardware device component to satisfy the property values of every tag, wherein the wiring components each represent a wire coupling the hardware devices within the cabinet represented by the hardware device components.

10. The method of claim 9, further comprising:
receiving, by the engineering workbench application executing on the computing device, an edited wiring index including alterations to one or more tags thereof; and
updating, in real time, a design of the industrial process control system in response to receiving the edited wiring index by the engineering workbench application executing on the computing device performing said parsing, said associating, said populating, said determining, and said generating on the edited wiring index.

11. The method of claim 9, wherein the schema represents nested level hardware device connections.

12. The method of claim 9, wherein the field devices each comprise a junction box, and wherein the hardware devices each comprise a control processor.

13. The method of claim 9, wherein the one or more definable property values each comprise a project-specific input/output allocation rule.

14. The method of claim 9, further comprising generating, by the engineering workbench application executing on the computing device in response to said mapping, one or more engineering reports based on the cabinet component, the hardware device components, and the wiring components.

15. The method of claim 14, wherein the generated engineering reports enable installation of the cabinet, the hardware devices, and the wires in the industrial process control system.

16. The method of claim 14, wherein the generated engineering reports comprise at least one of: a bill of materials, heat and power calculations, a cross-wiring diagram, an input/output pin assignment, and a cabinet loading report.

17. A method comprising performing the computer-implemented method set forth in claim 9 and installing hardware devices in said cabinet within the industrial process in accordance with said hardware device components that are populated in the cabinet component and installing wires that connect the installed hardware devices in accordance with the wiring components that are mapped between the hardware device components.

18. A method comprising:
designing an arrangement of hardware devices within a cabinet of an industrial process control system, wherein the arrangement satisfies one or more requirements of the industrial process control system;
designing connections between the arranged hardware devices, wherein the connections satisfy the requirements of the industrial process control system;
receiving an edited wiring index comprising one or more tags representing alterations to the requirements of the industrial process control system;
modifying at least one of the arrangement of hardware devices and the connections therebetween in real time by an automated engineering workbench application executing on a computing device parsing the edited wiring index and associating a wiring typical that comprises a schema representing one or more definable property values of the field device represented by a tag with each tag of the edited wiring index; and
installing hardware devices and wires in the cabinet in accordance with the modified arrangement and connections.

19. The method of claim 18, further comprising generating an engineering report reflecting the modified arrangement and connections, wherein the engineering report comprises at least one of: a bill of materials, heat and power calculations, a cross-wiring diagram, an input/output pin assignment, and a cabinet loading report.

* * * * *